United States Patent
Smith

(10) Patent No.: US 7,464,976 B2
(45) Date of Patent: Dec. 16, 2008

(54) VEHICLE BED STORAGE RACK AND BED DIVIDER

(75) Inventor: Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 11/588,822

(22) Filed: Oct. 27, 2006

(65) Prior Publication Data

US 2007/0132263 A1 Jun. 14, 2007

Related U.S. Application Data

(60) Provisional application No. 60/731,430, filed on Oct. 28, 2005.

(51) Int. Cl.
*B60P 3/00* (2006.01)
(52) U.S. Cl. .................. 296/3; 296/26.11
(58) Field of Classification Search .............. 296/3, 296/37.6, 39.2, 105, 37.1, 100.17; 280/79.3, 280/79.11; 224/401, 402, 403, 42.21, 404; 414/462
See application file for complete search history.

(56) References Cited

U.S. PATENT DOCUMENTS

| | | | |
|---|---|---|---|
| 171,736 A | 1/1876 | Mooney | |
| 341,307 A | 5/1886 | Altschwager | |
| 600,898 A | 3/1898 | Smith | |
| 1,242,035 A | 10/1917 | Pierson et al. | |
| 1,266,521 A | 5/1918 | Norquist | |
| 1,272,620 A | 7/1918 | Carlson | |
| 1,289,997 A | 12/1918 | Wyeth | |
| 1,655,777 A | 1/1928 | Weiland | |
| 1,655,797 A | 1/1928 | Peck | |
| 1,764,615 A | 6/1930 | Edwards | |
| D160,213 S | 9/1950 | Samuelson | |
| 2,621,357 A | 12/1952 | Stuman | |
| 2,626,179 A | 1/1953 | Gonzalez | |
| RE23,814 E | 4/1954 | Ingram | |
| 2,720,414 A | 10/1955 | Hart | |
| 2,795,363 A | 6/1957 | Turner | |
| 3,656,801 A | 4/1972 | Doutt et al. | |
| 3,734,560 A | 5/1973 | Cramblet | |
| 3,902,599 A | 9/1975 | Stromberg | |
| 4,023,850 A | 5/1977 | Tillery | |
| 4,132,335 A * | 1/1979 | Ingram ................. | 224/324 |
| 4,136,905 A | 1/1979 | Morgan | |
| 4,295,587 A * | 10/1981 | Bott ..................... | 224/321 |
| D266,836 S * | 11/1982 | Ingram ................. | D12/414 |
| D267,247 S * | 12/1982 | Kowalski et al. ...... | D12/414 |

(Continued)

*Primary Examiner*—Kiran B. Patel
(74) *Attorney, Agent, or Firm*—Knobbe Martens Olson & Bear LLP

(57) ABSTRACT

A vehicle bed storage device may include a rotatable beam. The beam is comprised of a pair of aligned tubular members. The beam is rotatable between a first position in which the storage device defines a vehicle bed divider and a second position in which the storage device defines an overhead storage rack. Rotatable joints connect the beam to the vehicle bed and allow the beam to be rotated between stops at the first position and the second position. At least one clamp maintains the aligned orientation of the tubular members of the beam. A sleeve based mounting interface may be applied to the tubular members of the beam to facilitate mounting various objects to the beam. Alternatively, a clamp-based mounting interface may be applied to the beam to facilitate mounting various objects to the beam.

6 Claims, 12 Drawing Sheets

U.S. PATENT DOCUMENTS

| | | | |
|---|---|---|---|
| 4,419,794 A | 12/1983 | Horton, Jr. et al. | |
| 4,451,075 A | 5/1984 | Canfield | |
| 4,470,716 A | 9/1984 | Welch | |
| 4,472,639 A | 9/1984 | Bianchi | |
| 4,531,773 A | 7/1985 | Smith | |
| 4,596,417 A | 6/1986 | Bennett | |
| 4,635,992 A | 1/1987 | Hamilton et al. | |
| 4,652,035 A | 3/1987 | Austin, Jr. | |
| D291,789 S | 9/1987 | Noga | |
| 4,749,226 A | 6/1988 | Heft | |
| 4,750,773 A | 6/1988 | Chapline et al. | |
| 4,770,458 A * | 9/1988 | Burke et al. | 296/3 |
| 4,778,213 A | 10/1988 | Palmer | |
| 4,786,119 A | 11/1988 | Smuda | |
| D300,734 S | 4/1989 | Kruitbosch | |
| 4,824,158 A | 4/1989 | Peters et al. | |
| 4,828,312 A | 5/1989 | Kinkel et al. | |
| 4,830,242 A | 5/1989 | Painter | |
| 5,024,409 A | 6/1991 | Bohnen | |
| 5,037,152 A | 8/1991 | Hendricks | |
| 5,037,153 A | 8/1991 | Stark | |
| D321,496 S * | 11/1991 | Sparham et al. | D12/414 |
| 5,083,829 A | 1/1992 | Fonseca | |
| D326,076 S | 5/1992 | Wiese | |
| 5,114,203 A | 5/1992 | Carnes | |
| 5,123,691 A | 6/1992 | Ginn | |
| 5,129,665 A * | 7/1992 | Sutter et al. | 280/274 |
| 5,147,103 A | 9/1992 | Ducote | |
| 5,154,470 A | 10/1992 | Bringham, Jr. | |
| 5,169,200 A | 12/1992 | Pugh | |
| 5,201,562 A | 4/1993 | Dorsey | |
| 5,253,913 A | 10/1993 | Metivier | |
| 5,299,773 A | 4/1994 | Bertrand | |
| 5,310,155 A | 5/1994 | Wu | |
| 5,396,915 A | 3/1995 | Bomar | |
| D360,614 S | 7/1995 | Alcocer | |
| 5,468,038 A | 11/1995 | Sauri | |
| D365,323 S | 12/1995 | Napierkowski et al. | |
| 5,588,630 A | 12/1996 | Chen-Chao | |
| 5,622,296 A | 4/1997 | Pirhonen | |
| 5,658,033 A | 8/1997 | Delaune | |
| 5,685,686 A * | 11/1997 | Burns | 414/462 |
| 5,700,047 A | 12/1997 | Leitner et al. | |
| 5,730,342 A | 3/1998 | Tien | |
| 5,743,589 A | 4/1998 | Felker | |
| D394,639 S | 5/1998 | Carter | |
| 5,752,800 A | 5/1998 | Brincks et al. | |
| 5,755,480 A | 5/1998 | Bryan | |
| 5,765,892 A | 6/1998 | Covington | |
| 5,775,759 A | 7/1998 | Cummins | |
| 5,788,311 A | 8/1998 | Tibbals | |
| 5,806,907 A | 9/1998 | Martinus et al. | |
| D399,481 S | 10/1998 | Larson et al. | |
| 5,820,188 A | 10/1998 | Nash | |
| 5,823,596 A | 10/1998 | Kulesza | |
| 5,853,116 A | 12/1998 | Schreiner | |
| 5,857,724 A | 1/1999 | Jarman | |
| D410,429 S | 6/1999 | Derecktor | |
| 5,911,464 A * | 6/1999 | White | 296/3 |
| 5,924,614 A * | 7/1999 | Kuntze et al. | 296/3 |
| D417,859 S | 12/1999 | Leitner et al. | |
| D418,106 S | 12/1999 | Leitner et al. | |
| 5,997,066 A | 12/1999 | Scott | |
| 6,019,410 A | 2/2000 | Trostle et al. | |
| 6,082,801 A | 7/2000 | Owen et al. | |
| 6,112,964 A * | 9/2000 | Cucheran et al. | 224/321 |
| 6,113,173 A | 9/2000 | Leitner et al. | |
| 6,123,305 A | 9/2000 | Lukasavitz | |
| 6,149,219 A * | 11/2000 | Schambre et al. | 296/57.1 |
| 6,227,593 B1 | 5/2001 | De Valcourt | |
| 6,257,637 B1 | 7/2001 | Reed | |
| 6,269,990 B1 | 8/2001 | Gray | |
| 6,283,525 B1 | 9/2001 | Morse | |
| 6,338,515 B1 | 1/2002 | Munhall | |
| 6,340,190 B1 | 1/2002 | Rosenburgh et al. | |
| 6,378,926 B1 | 4/2002 | Renze et al. | |
| 6,390,427 B1 * | 5/2002 | McConnell et al. | 248/231.61 |
| 6,402,215 B1 | 6/2002 | Leitner et al. | |
| 6,422,627 B1 | 7/2002 | Kuhn et al. | |
| 6,425,618 B1 * | 7/2002 | Garland et al. | 296/3 |
| 6,513,688 B2 * | 2/2003 | Kmita et al. | 296/37.6 |
| 6,540,123 B1 | 4/2003 | Kmita et al. | |
| 6,550,841 B1 | 4/2003 | Burdon et al. | |
| 6,557,918 B2 | 5/2003 | Lafrate et al. | |
| 6,561,560 B2 | 5/2003 | Brown et al. | |
| 6,598,922 B2 | 7/2003 | Morse et al. | |
| 6,607,228 B2 | 8/2003 | Carter, III et al. | |
| 6,676,182 B2 | 1/2004 | Fitts | |
| 6,719,261 B2 | 4/2004 | Wadsworth | |
| 6,719,345 B2 * | 4/2004 | Ootsuka et al. | 296/26.08 |
| 6,805,392 B2 | 10/2004 | Leitner et al. | |
| 6,889,878 B2 | 5/2005 | Parsons | |
| 6,948,763 B2 | 9/2005 | Robbins | |
| 6,966,595 B2 | 11/2005 | Bruford et al. | |
| 6,994,389 B1 * | 2/2006 | Graffy et al. | 296/26.11 |
| 7,007,995 B1 * | 3/2006 | Scarberry et al. | 296/26.11 |
| 7,195,432 B2 * | 3/2007 | Earle et al. | 296/26.09 |
| D544,826 S * | 6/2007 | Smith | D12/414 |
| D553,072 S * | 10/2007 | Smith | D12/414 |
| 2002/0000732 A1 | 1/2002 | Sanders | |
| 2002/0096901 A1 | 7/2002 | Iafrate et al. | |
| 2002/0153737 A1 | 10/2002 | Fitts | |
| 2003/0111858 A1 | 6/2003 | Carter, III et al. | |
| 2004/0080174 A1* | 4/2004 | Buelna | 296/26.11 |
| 2004/0134953 A1 | 7/2004 | Perez | |
| 2005/0077747 A1 | 4/2005 | De Gaillard et al. | |

* cited by examiner

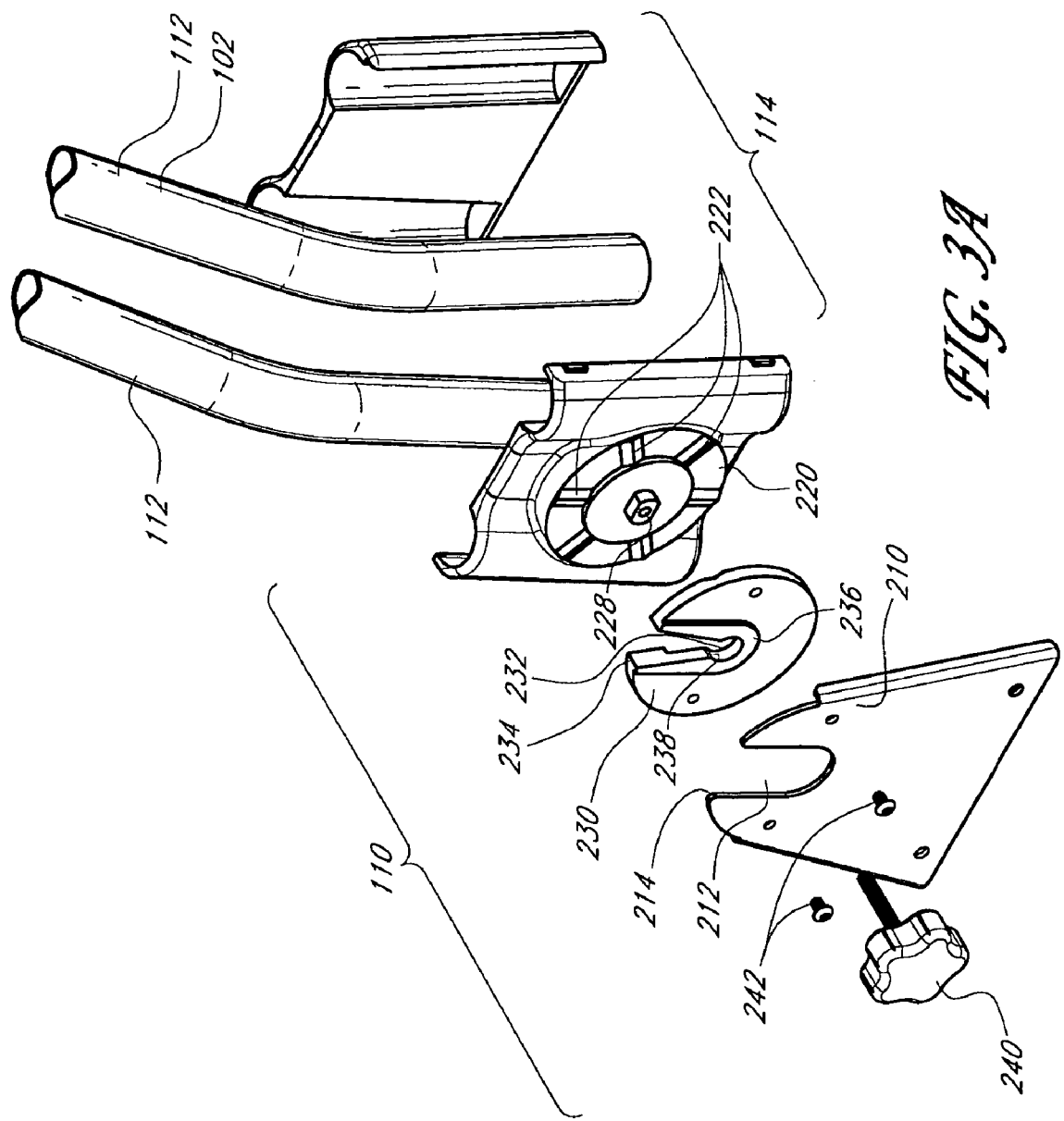

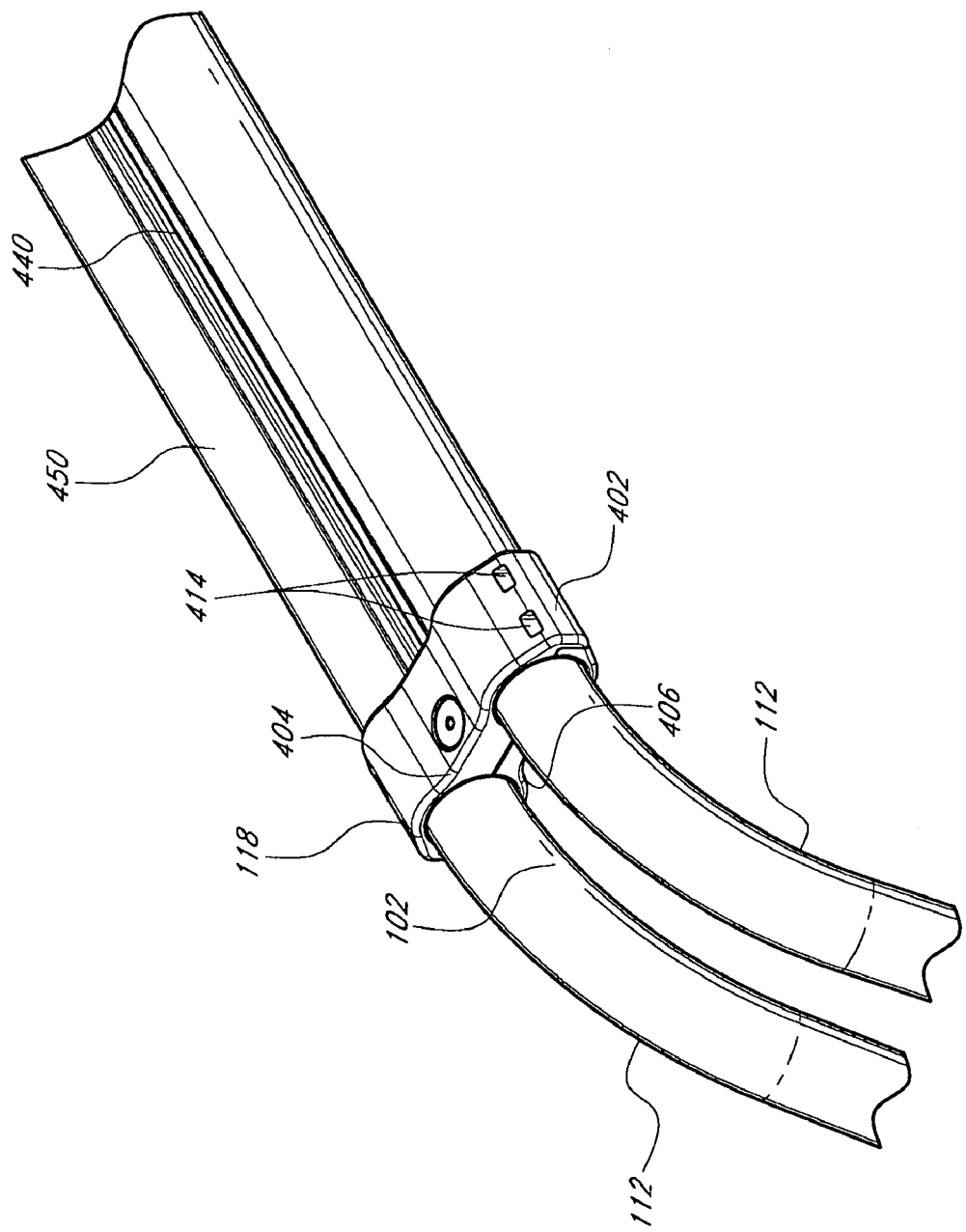

VEHICLE BED STORAGE RACK AND BED DIVIDER

CROSS-REFERENCE TO RELATED APPLICATIONS

This application claims the benefit of U.S. Provisional Patent Application No. 60/731,430, entitled "VEHICLE BED STORAGE RACK AND BED DIVIDER," filed on Oct. 28, 2005.

Also, this application hereby incorporates by reference the above-identified provisional application, in its entirety.

BACKGROUND OF THE INVENTION

1. Field of the Invention

The present invention relates to vehicle storage racks generally, and, more specifically, to rotatable and movable vehicle storage racks for mounting to pick-up truck beds.

2. Description of the Related Art

Vehicles having open cargo beds such as pick up trucks offer great cargo-hauling versatility. However, the cargo hauling ability of a vehicle's bed is often limited by the length and width of the bed. Oversized or oddly-shaped items such as, for example, various lengths of lumber, building materials, building tools such as ladders, or recreational items such as bicycles, surfboards, canoes may not fit within a vehicle's bed as sidewalls and a tailgate of the bed define the bed's storage area. However, these oversized items may still be transported through the use of an overhead storage rack to which an oversized item may be secured.

Various vehicle overhead storage racks are known. For example, application-specific storage racks have been applied to automobile roofs to allow an automobile to transport luggage, or recreational items such as bicycles, skis or surfboards that may be too large to fit within an automobile's cabin. These racks are typically fixedly secured to the automobile, for example by clamping to the automobile's rain gutter or other mounting channel formed in the roof of the automobile. As these racks are often application specific (i.e., configured to hold skis only, or configured to hold luggage only) and fixedly secured to a vehicle's roof, they offer little versatility.

Overhead racks adapted for use over truck beds offer even more limited versatility. Typically, truck bed racks are application-specific fixed frame assemblies bolted or welded to the sidewalls of the vehicle bed. For example, vehicle bed storage racks are known that include a metal frame welded to the vehicle bed's sidewalls and cargo floor. Some racks are repositionable along a truck extending along each side of the truck bed. It also has been suggested that the frame be rotatable between a deployed position and a storage position, wherein the rack is positioned substantially within the truck bed.

Regardless of its rotatability, however, the metal frame is effectively application specific, for example, it could be configured to hold multiple panes of glass, gardening tools, or large sheets of wood, drywall, or other building materials. While these frames enhance the hauling ability of a vehicle bed, they require an involved installation to the vehicle and are not typically adaptable to multiple types of uses. Therefore, a user who might wish to haul several bicycles one day and building supplies the next would be unable to do so without an involved de-installation and installation of roof racks dedicated to each. Thus, there is a need in the art for a versatile, multifunction vehicle bed overhead rack that can be easily configured and reconfigured for a desired use.

SUMMARY OF THE INVENTION

In various embodiments, a vehicle bed storage device is described that overcomes the shortcomings of the prior art and provides a versatile vehicle storage system. The vehicle storage system desirably facilitates the use of many different application specific mounts and mounting brackets such that the vehicle bed storage device may be used to transport building supplies, recreational gear, or other oversized items.

In certain embodiments, a vehicle bed storage device comprises a beam. The beam comprises two aligned tubular members. The beam has a short profile defined by a width of the beam significantly less than a height of a tailgate of the vehicle bed.

In other embodiments, a rotatable storage device comprises a rotatable beam and a rotatable joint. The rotatable beam is configured to be rotated with respect to a vehicle bed between a first position in which the beam forms a divider of the vehicle bed and a second position in which the beam forms an overhead storage rack. The rotatable joint is configured to couple the rotatable beam to the vehicle bed. The rotatable joint comprises a first interlocking portion, a second interlocking portion, and an axle pivotally connecting the first interlocking portion, the second interlocking portion. The first interlocking portion is configured to be coupled to a sidewall of vehicle bed. The second interlocking portion is configured to be coupled to the rotatable beam. The axle pivotally connects the first interlocking portion and the second interlocking portion and defines an axis of rotation of the joint. The first interlocking portion is rotatable with respect to the second interlocking portion about the axis of rotation. An interaction of first interlocking portion with the second interlocking portion defines at least two stop positions in which the positions of the first interlocking portion and the second interlocking portion are fixed relative to each other. The second interlocking portion is slidably removable from the rotatable joint without removing the axle from the second interlocking portion.

In other embodiments, a device for coupling more than one aligned tubular member comprises a housing. The housing comprises a first housing portion and a second housing portion. The first housing portion comprises more than one recess, and each recess is configured to receive a portion of one of the more than one aligned tubular member. The first housing portion also desirably has at least one first interference surface. The second housing portion comprises at least one second interference surface shaped and configured to mate with the first interference surface of the first housing portion to define a mating engagement of the first and second housing portions.

In other embodiments, a mount apparatus comprises a sleeve, a first clamp, and a second clamp. The sleeve has a first end and a second end. The sleeve comprises an elongate body, at least one passage extending longitudinally through the body, and a channel extending over at least a portion of the body. The passage is shaped and configured to admit a tubular segment. The channel is configured to receive a mounted device. The first clamp is configured to substantially encircle and configured to be mounted to the tubular segment adjacent the first end of the sleeve. The second clamp is configured to substantially encircle and configured to be mounted to the tubular segment adjacent the second end of the sleeve. The first and second clamps restrict sliding movement of the sleeve relative to the tubular member.

In other embodiments, a mount apparatus comprises a housing and a mounting bracket. The housing comprises a first housing portion and a second housing portion. The first housing portion comprises more than one recess. Each recess is configured to receive a portion of one more than one aligned tubular members. The first housing portion has at least one first interference surface. The second housing portion has more than one recess. Each recess is configured to receive a portion of one of more than one aligned tubular members. The second housing portion has at least one second interference surface configured to mate with the at least one first interference surface on the first housing portion such that mating of the first interference surface with the second interference surface defines a mating engagement of the first and second housing portions. The mounting bracket extends from the housing and is configured to retain cargo.

In other embodiments, a vehicle storage assembly comprises at least two vehicle storage racks. At least one of the vehicle storage racks is configured to be rotatably coupled to a vehicle bed. The rotatably coupled vehicle storage rack is rotatable between a first position in which the vehicle storage rack defines a bed divider and a second position in which the vehicle storage rack defines an overhead storage rack. The rotatable vehicle storage rack comprises a rotatable beam. The rotatable beam comprises two aligned tubular members.

BRIEF DESCRIPTION OF THE DRAWINGS

FIG. 3A illustrates an exploded perspective view of the rotatable joint of FIG. 2;

FIG. 4 illustrates a perspective view of a tubular clamp for use on the storage rack of FIG. 1;

DETAILED DESCRIPTION OF THE PREFERRED EMBODIMENT

Vehicle Bed Storage Device

Figure 1:
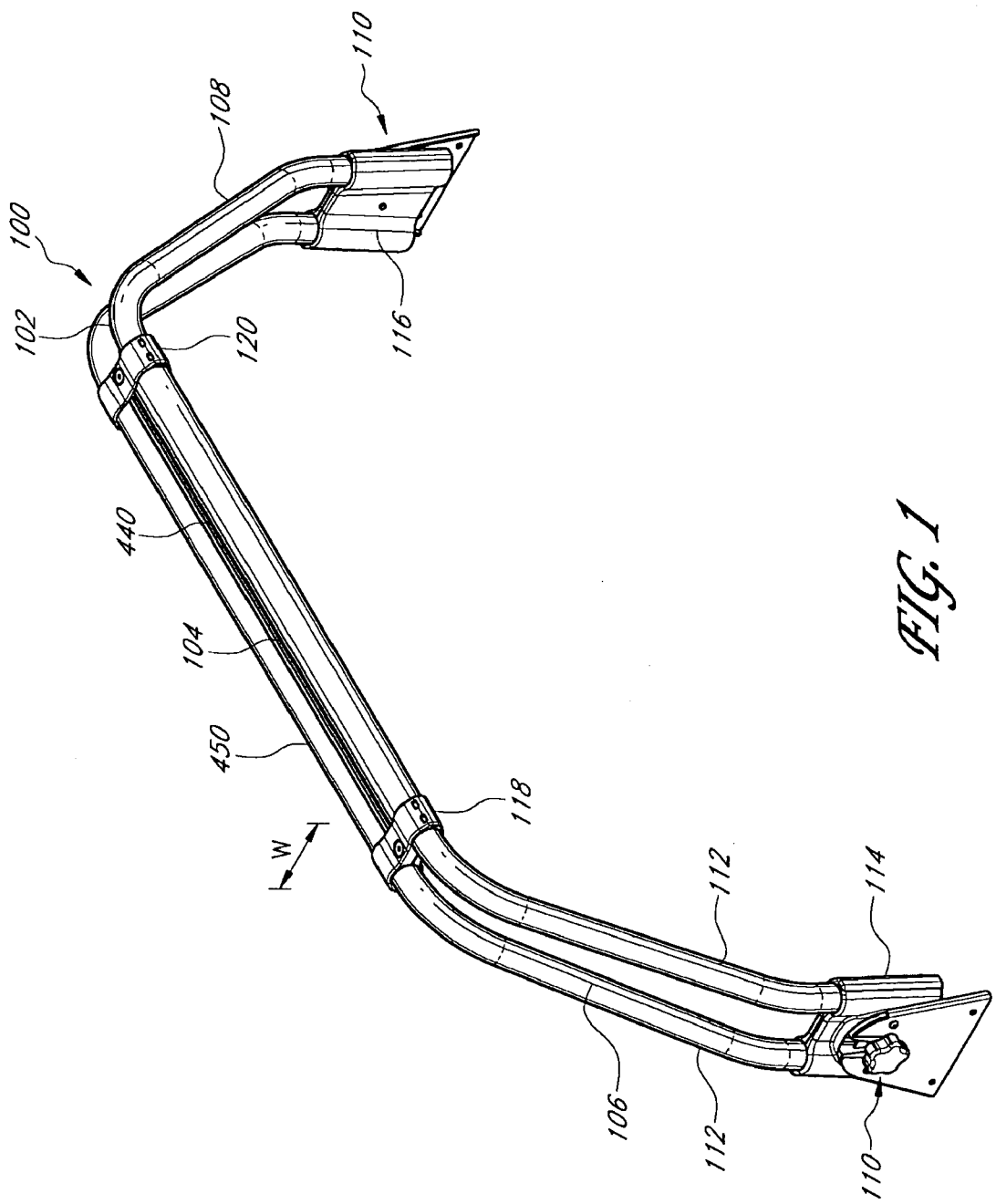
FIG. 1 illustrates a perspective view of a preferred embodiment of vehicle bed storage rack.

With reference to FIG. 1, a vehicle storage device 100 comprises a beam 102. In certain embodiments, the beam 102 is fixed with respect to a vehicle bed. In other embodiments, the beam 102 is desirably configured to be rotatably coupled to the vehicle bed. The beam 102 includes a substantially horizontal segment 104 having a length desirably approximately equal to a width of the vehicle bed. It is contemplated that the substantially horizontal segment 104 may alternatively have a length equal to a portion of the width of the vehicle bed such as, for example, approximately one-half of the vehicle bed width. In embodiments where the horizontal segment 104 is a fraction of the width of the vehicle bed, it is contemplated that one end of the beam is coupled to a side wall of the vehicle bed and the opposite end of the beam is coupled to the floor of the vehicle bed, thus facilitating access to the open fractional width of the vehicle bed. The rotatable beam 102 also includes a first riser segment 106 having a first end configured to be rotatably connected to a side of the vehicle bed and a second riser segment 108 having a first end configured to be rotatably connected to an opposite side of the vehicle bed. As discussed further below, the riser segments 106, 108 are preferably coupled to the vehicle bed by rotatable joints 110 that may be easily be adjusted to allow rotation of the beam 102 and that may be repositioned along the length of the vehicle bed. The substantially horizontal segment 104 spans from a second end of the first riser segment 106 to a second end of the second riser segment 108.

Figure 10:
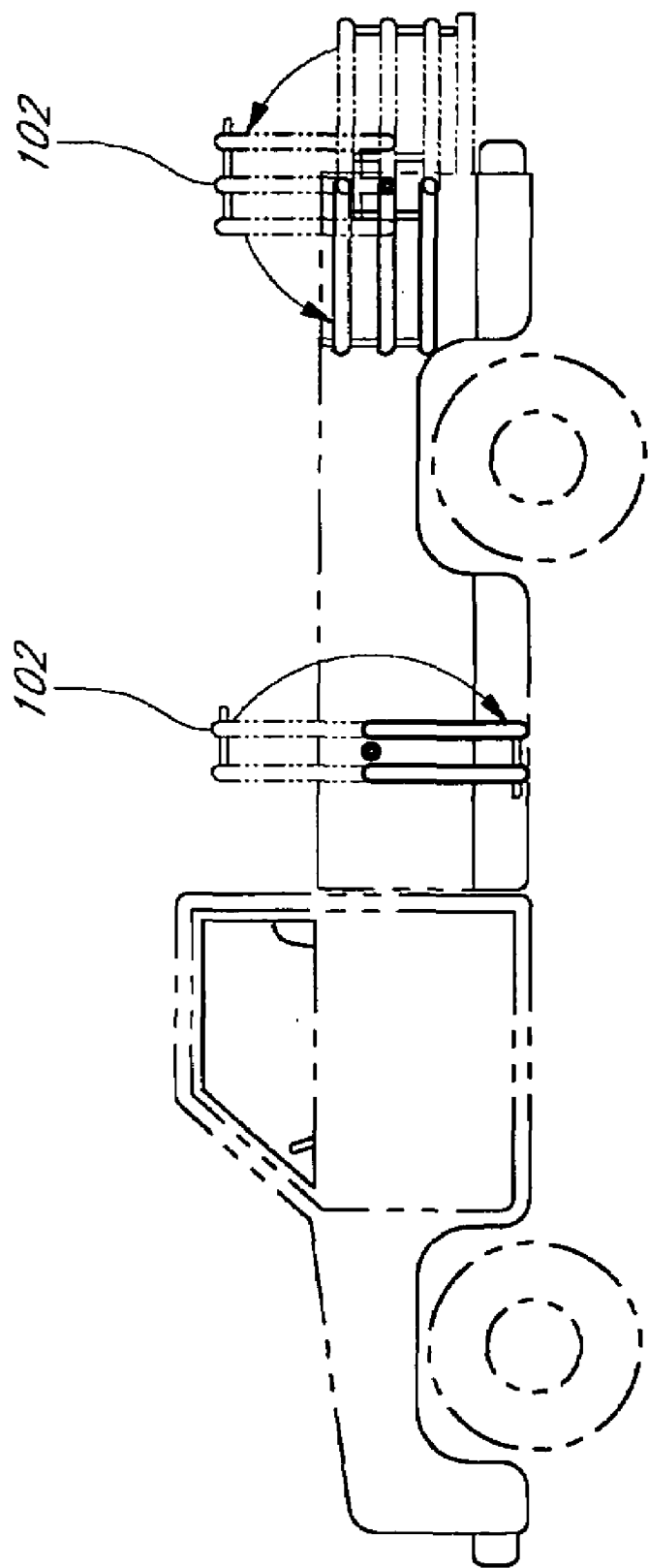
FIG. 10 illustrates a side view of a vehicle bed with a vehicle storage assembly including multiple vehicle bed storage racks.

The beam 102 is desirably rotatable between a first position in which the substantially horizontal segment 104 is a minimum distance from the vehicle bed and a second position in which the substantially horizontal segment 104 is a maximum distance from the vehicle bed. When positioned in the first position, the rotatable beam 102 acts as a bed divider, sectioning the vehicle bed into smaller areas. In alternative embodiments, as illustrated in FIG. 10, the beam 102 may be rotatable between a first position in which the beam forms a bed extender for the vehicle bed, and a second position in which the beam forms an overhead storage rack. In the first position, the rotatable beam 102 may thus restrict movement of small cargo loads, especially those containing fragile items, thus preventing spillage or breakage of those loads. Multiple storage devices 100 may be used to divide a single vehicle bed into multiple compartments.

In the embodiments illustrated in FIGS. 1-9, the horizontal segment 104 has a very short profile when the beam 102 is in the first position. The short profile is defined by a width of the beam, W (FIGS. 1 and 7) that is significantly less than a height of a tailgate of the vehicle bed. The short profile is preferably a width W of the beam 102 of less than one foot, desirably less than ten inches, and may be less than eight inches. Advantageously, therefore, when the beam 102 is in the first position to form a bed divider, the storage area of the vehicle bed is not substantially reduced. Thus, the available storage space in the vehicle bed is maximized.

Figure 11:
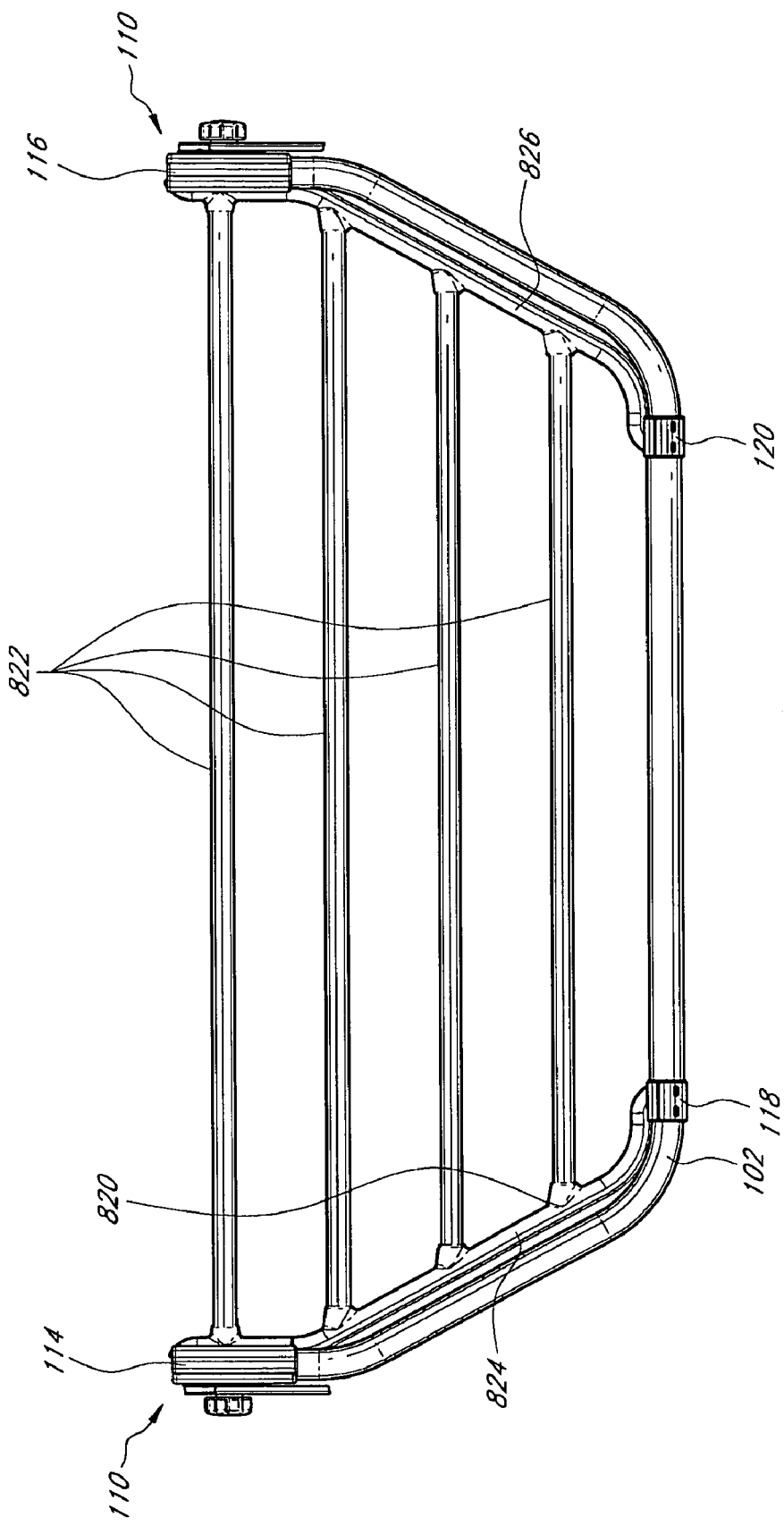
FIG. 11 illustrates a front view of a storage device in a bed divider configuration.
Figure 12:
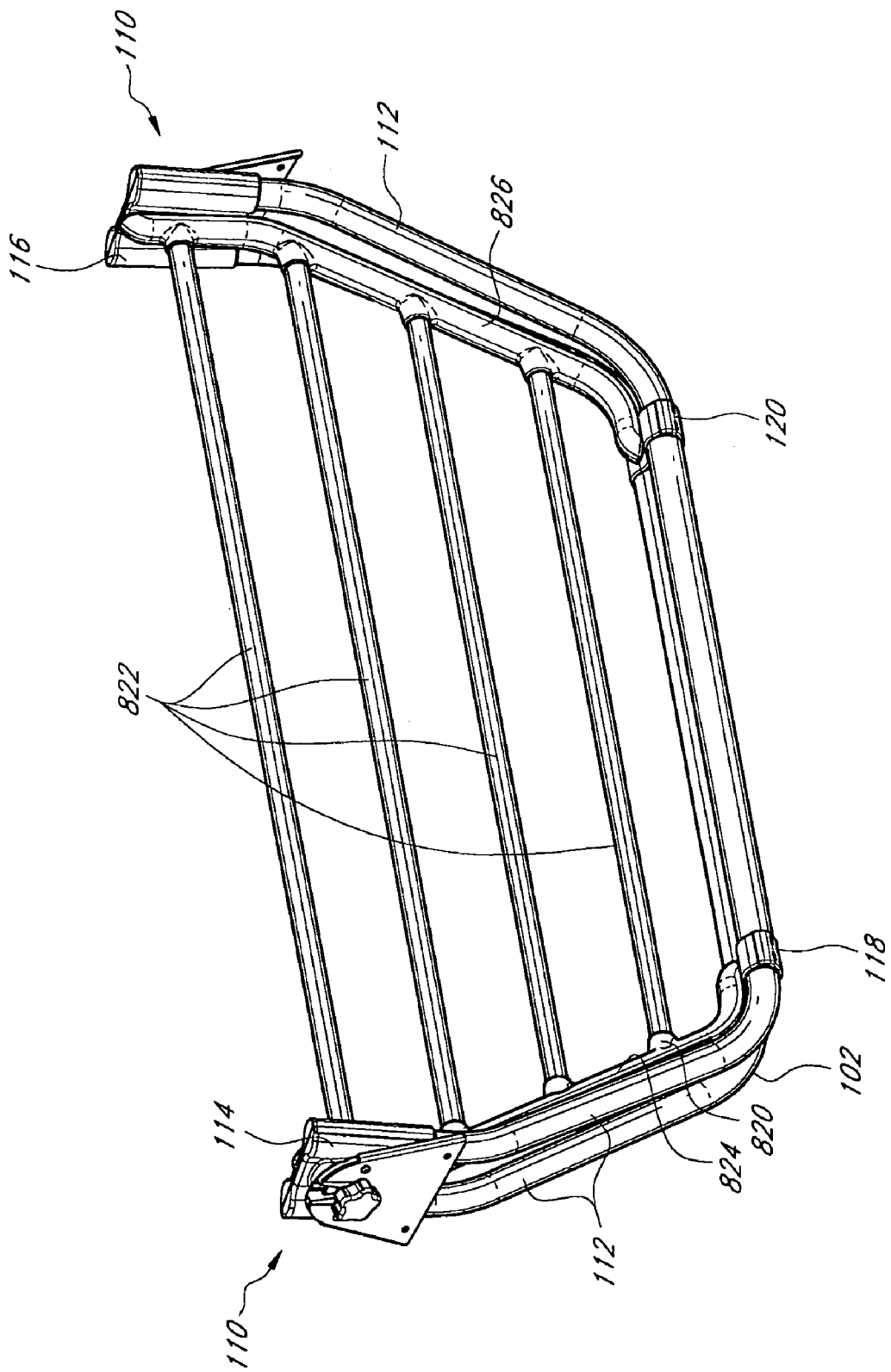
FIG. 12 illustrates a perspective view of a storage device in a bed divider configuration.

In certain embodiments, a screen, grate, or a plurality of tubular members may extend across an area bounded by the first and second riser segments 106, 108 and the substantially horizontal segment 104. FIGS. 11 and 12 illustrate a divider assembly 820 comprising a plurality of tubular members 822 connected to a first leg 824 and a second leg 826. The first and second legs 824, 826 are configured to be removably connected to the beam such that the divider portion may be easily removed when the beam 102 is not used as a bed divider. In certain embodiments, the legs 824, 826 may be configured to be removably attachable to the clamps 114, 116, 118, 120 of the storage device 100. Advantageously, the divider assembly 820 restricts movement of cargo across the vehicle bed from one side of the beam 102 to the other. Further, a divider assembly 820 comprising tubular members 822 provides several advantages over a screen or grate-based divider. Notably, tubular members 822 provide a high strength assembly with relatively low weight and low aerodynamic resistance. Thus, the illustrated divider assembly 820 may restrict sudden movements of heavy cargo items without unduly burdening the vehicle in terms of weight or fuel economy. Additionally, the tubular members 822 may be used to secure cargo as they may be used as tie down locations or cord routing locations for ropes, cables, or straps used to secure cargo.

In the second position, the beam 102 forms an overhead storage rack. As discussed in further detail below with respect to mounting clamps and sleeves, the substantially horizontal segment 104 may be used in conjunction with general use or application-specific mounting brackets to mount a wide variety of cargo to the overhead storage rack. Multiple storage devices 100 may be used on a single vehicle bed to form an overhead storage rack to provide multiple support points for relatively long items such as ladders, lumber, or surfboards, or to provide additional support for particularly heavy items. In embodiments where multiple storage devices 100 are used, the storage devices may be spaced such that the overhead storage rack overlies only a portion of the vehicle bed such as half the bed. Advantageously, tall objects may still be hauled in the open portion of the bed, and the overhead rack may be used to transport objects over the other portion of the bed. Alternatively, multiple storage devices 100 may be positioned such that the overhead storage rack overlies substantially the entire vehicle bed, such as, by positioning one storage device near a front end of the bed and another storage device near a back end of the bed. Advantageously, this substantially full bed-length storage rack provides support for long objects.

Additionally, as discussed below with reference to FIGS. 2 and 3, in a preferred embodiment, the beam 102 is rotatable between a first and a second position and securable in a plurality of intermediate positions between the first and second positions. In these intermediate positions, the beam 102 may provide a tie down or restraint for oddly sized and shaped cargo.

In the illustrated embodiments, the rotatable beam 102 is formed from two aligned tubular members 112. The alignment of the tubular members 112 may be substantially parallel along the substantially horizontal segments and convergent along the first riser segments 106 and second riser segments 108, as illustrated in FIG. 1. As used herein, tubular members are elongate bodies having a non-rectangular cross section such as tubular bodies having a generally circular, oval, elliptical, or other non-rectangular cross section. Preferably, the tubular members 112 are generally hollow metal tubes. Advantageously, generally hollow metal tubes can be formed into a rotatable beam 102 of relatively low weight and high strength. Furthermore, metal tubes are widely commercially available, inexpensive to acquire, and inexpensive to configure into a rotatable beam 102. While the illustrated embodiments feature two aligned tubular members 112, it will be apparent to one of skill in the art that in other embodiments, the rotatable beam 102 could comprise more or fewer tubular members and enjoy some advantages of the preferred embodiment.

In embodiments of rotatable beam 102 comprising more than one tubular member 112, to maintain the aligned nature of the tubular members 112, at least one clamp desirably retains both of the tubular members 112. With reference to the embodiment illustrated in FIG. 1, four clamps maintain the relative positioning of the two tubular members 112. A first endcap clamp 114 retains the tubular members 112 at the first end of the first riser segment, and a second endcap clamp 116 retains the tubular members 112 at the first end of the second riser segment 108. A first mount clamp 118 maintains the tubular members 112 at a first end of the substantially horizontal segment 104, and a second mount clamp 120 maintains the tubular members 112 at a second end of the substantially horizontal segment 104.

In the illustrated embodiments, the clamps 114, 116, 118, 120 maintain two tubular members 112 in alignment in close proximity to one another. However, it is contemplated that in alternative embodiments, the clamps 114, 116, 118, 120 could space the tubular members 112 such that they span a portion of the vehicle bed. For example, in these alternative embodiments, the beam 102 could overlie up to one half of a length of the vehicle bed when the beam 102 is positioned as an overhead rack.

While the illustrated embodiment includes four clamps 114, 116, 118, 120, it will be appreciated by one of skill in the art that more or fewer clamps could be used to retain the relative spacing of the tubular members 112. Moreover, it will be further appreciated by one of skill in the art that other structures or techniques could be applied to retain the relative positioning of two or more aligned tubular members 112 forming a rotatable beam 102 and enjoy some advantages of the preferred embodiment. For example, the tubular members 112 could be welded together, joined together by removable fasteners such as nuts and bolts, adhered together, or joined by some other similar technique.

As depicted in FIG. 10, multiple vehicle bed storage devices with rotatable beams 102 may be applied to a single vehicle bed to form a vehicle storage system. Additionally, FIG. 10 depicts an embodiment of vehicle bed support device having a rotatable beam 102 configured to rotate between a first position in which the beam 102 forms a tailgate enclosure, a second position in which the beam forms an overhead storage rack, and a third position in which the beam forms a bed divider. Such a beam 102 may be rotatably coupled to the vehicle bed near a tailgate end of the bed. As such, a vehicle storage system provides great versatility for a vehicle bed to transport many shapes and sizes of cargo.

Rotatable Joint

Figure 2:
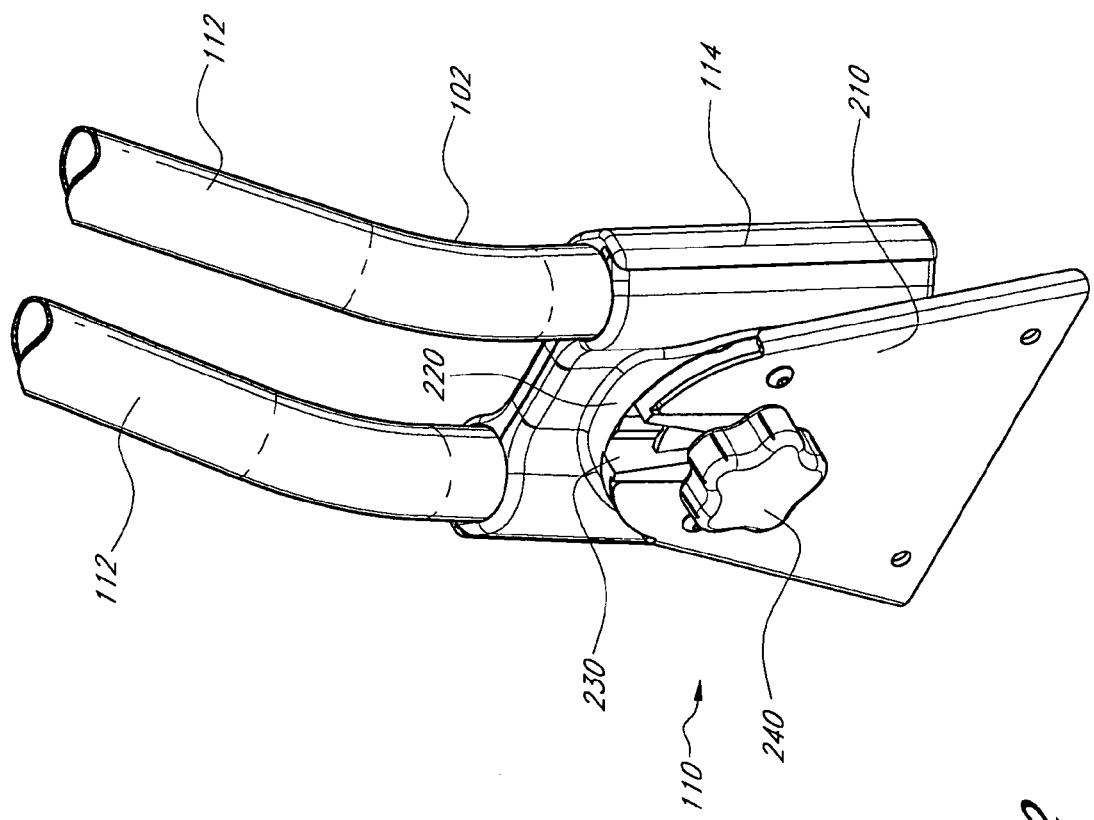
FIG. 2 illustrates a perspective view of a rotatable joint of the storage rack of FIG. 1.
Figure 3B:
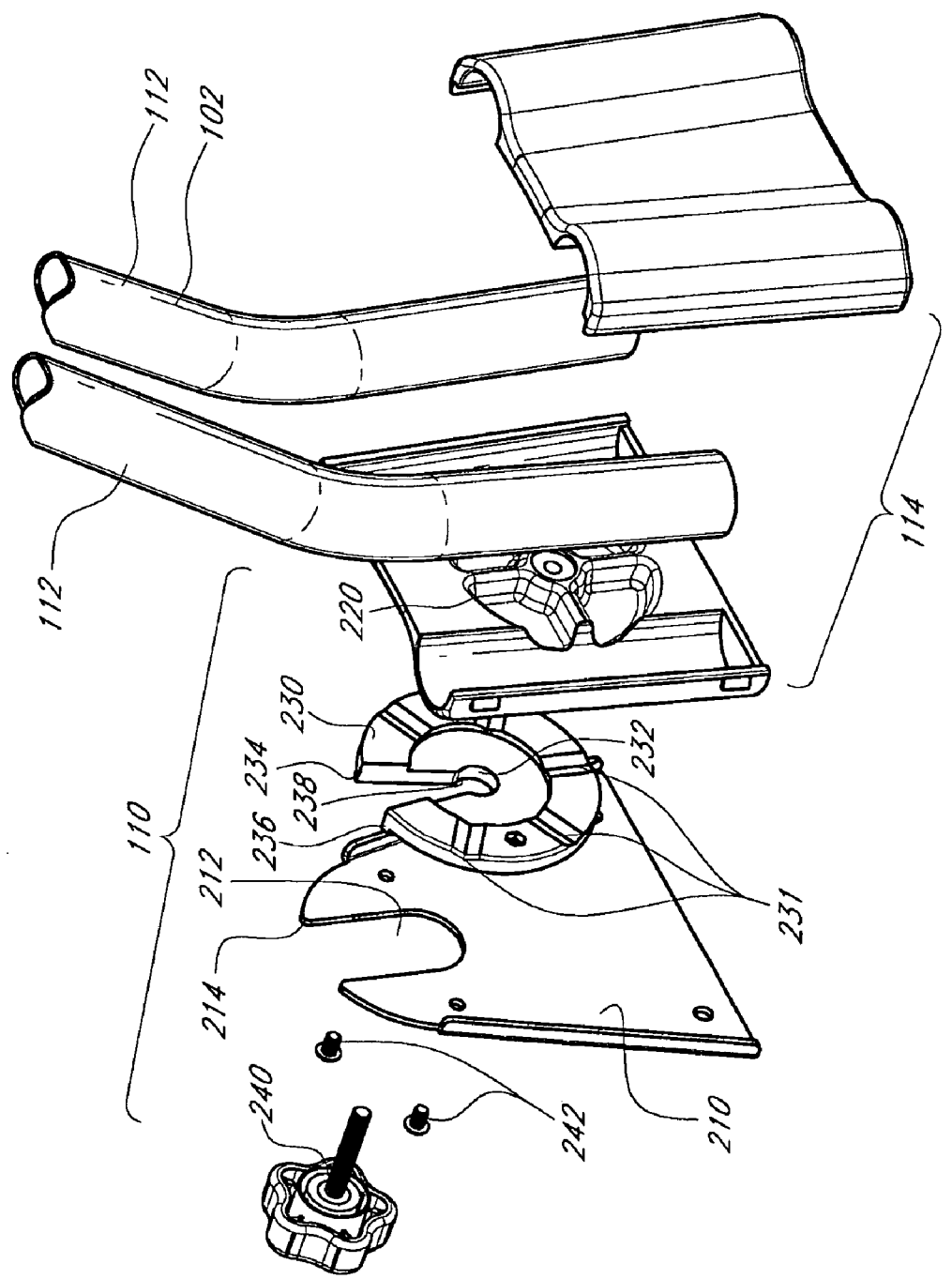
FIG. 3B illustrates an exploded perspective view of the rotatable joint of FIG. 2 from a reverse angle.

With reference to FIGS. 2, 3A, and 3B, the rotatable beam 102 may further comprise a rotatable joint 110 on the first riser segment 106 spaced from the substantially horizontal segment 104 and a rotatable joint 110 on the second riser segment 108 spaced from the substantially horizontal segment 104 to rotatably couple the beam 102 to the vehicle bed. The rotatable joints 110 are preferably near the first end of the first riser segment and the first end of the second riser segment. In the illustrated embodiments, the rotatable joint 110 comprises a first interlocking portion 210 configured to be coupled to a sidewall of the vehicle bed, such as by coupling to the rail of the sidewall, a second interlocking portion 220 configured to be coupled to a beam 102 in a storage device 100, and an axle 240. In the illustrated embodiments, the rotatable joint 110 is adjustable between a secured position in which the first interlocking portion 210 and the second interlocking portion 220 are biased towards one another such that rotation of the joint is restricted, and a rotatable position in which the first interlocking portion 210 and the second interlocking portion 220 are easily rotatable with respect to each other. It will be appreciated by one of skill in the art that other joints such as simple hinges could be used to rotatably couple a beam 102 as described above with reference to FIG. 1 to a vehicle bed.

The first interlocking portion 210 is configured to be coupled to the sidewall of the vehicle bed such as by coupling to a rail on the vehicle bed. Typically beds on vehicles such as pick up trucks include cargo support rails extending along the sidewalls of the vehicle bed. Preferably, the first interlocking portion 210 is configured to be removably attached to the rail such that the rotatable joint 110 may be easily applied, removed, or repositioned along the length of a vehicle bed rail. Thus, the beam 102 of a storage device may be easily repositioned where desired along the length of a vehicle bed.

In storage rack systems having multiple storage devices 100, the storage devices 100 may easily be positioned relative to each other to support cargo mounted to the beams 102, or the vehicle bed may easily be divided to a desired configuration to restrict movement of cargo of various shapes.

In the illustrated embodiments, the first interlocking portion 210 includes a bed mount and a first interlocking surface 230. In the illustrated embodiments, the bed mount and the first interlocking surface 230 are individual components, advantageously allowing each to be constructed of a material suited to its particular strength and rigidity requirements. For example, the bed mount may be constructed of a metal, and the first interference surface may be constructed of a plastic, composite, or polymer material. Alternatively, the bed mount and the first interlocking surface 230 may be integrally formed as a single component of the rotatable joint 110. The first interlocking portion 210 comprises an opening 212 to receive an axle 240 defining an axis of rotation of the rotatable joint 110. The opening 212 has an open end 214, allowing the second interlocking portion 220 to be quickly and easily slidably removed from other components of the rotatable joint 110. Thus, in a vehicle bed storage device, the first interlocking portion 210 may remain in a desired position along the vehicle bed rail while the beam 102 is removed from the vehicle without removing the axle 240 from the rotatable joint 110. Alternatively, the opening 212 in the first interlocking portion 210 may be a closed annular aperture configured to receive an axle 240, but not allowing rapid removal of the beam 102.

With reference to FIGS. 2, 3A and 3B, the rotatable joint 110 also includes a second interlocking portion 220 configured to be coupled to a beam 102 in a storage device. In the illustrated embodiment, the second interlocking portion 220 includes a second interlocking surface integrally formed with an endcap clamp 114 for the tubular members 112. However, it will be appreciated by one of skill in the art that the second interlocking portion 220 could be comprised of a various different structures, such as a support structure integrally formed with the beam 102, a support structure that is mounted to the beam 102, or a separate support that is affixed to an endcap clamp 114.

In the illustrated embodiments, the second interlocking portion 220 comprises a second interlocking surface comprising a generally circular raised area on the endcap clamp 114. The second interlocking portion 220 has a hub 226 through which the axle 240 passes. The second interlocking surface comprises a plurality of ridges 222 extending from the hub 226 to an outer edge of the second interlocking surface. As discussed in further detail below, the ridges 222 are configured to mate with the recesses 231 in the first interlocking surface 230 to define a plurality of stops. When the rotatable joint 110 is used in conjunction with a vehicle bed storage device as described above with reference to FIG. 1, the stops of the rotatable joint 110 allow the beam 102 to be securely positioned in a plurality of positions. Desirably, the second interlocking portion 220 comprises two ridges 222 angularly spaced approximately 180 degrees from each other, corresponding to the first position of the storage device and the second position of the beam 102. Preferably, the second interlocking portion 220 comprises more than two ridges 222 corresponding to more than two stops for securing the beam 102. While in the illustrated embodiments, ridges 222 formed on the second interlocking portion 220 mate with recesses 231 of the first interlocking surface 230 to define a plurality of stops, it will be appreciated by one of skill in the art that other interlocking portions could define stops for the rotatable joint 110. For example, the first interlocking portion 210 could include a plurality of ridges configured to mate with an opening or recess on the second interlocking portion 220.

In the illustrated embodiments, the first interlocking portion 210 includes a first interlocking surface 230 disposed between the bed mount and the second support 220. As best illustrated in FIG. 3, the first interlocking surface 230 is a generally circular plate having an opening 232 for receiving the axle 240. The opening 232 has an open end 234 corresponding to the open end 214 of the first interlocking portion 210. The first interlocking surface 230 has a variable thickness such that the first interlocking surface 230 is thickest at an upper edge adjacent the open end 234 of the opening 232, and thinnest at a lower edge opposite the opening 232. The first interlocking surface 230 may have an alignment feature such as a tab, notch, or ridge to maintain alignment of the opening of the first interlocking surface 230 with the bed mount. Preferably, the first interlocking surface 230 includes a ridge 236 surrounding the opening 232 that is configured to mate with the opening 212 of the first interlocking portion 210 to prevent rotation of the first interlocking surface 230 relative to the bed mount. Desirably, the first interlocking surface is attached to the bed mount with screws, bolts, or another fastener 242.

Advantageously, having a first interlocking portion 210 and a second interlocking portion 220, each with contacting and interlocking surfaces distributes locking loads over a large surface area, reducing the load on any one individual component of the rotatable joint. Additionally, the rotatable joint 110 is easily manufacturable through injection molding techniques.

As best illustrated in FIGS. 3A and 3B, which depict an exploded view of the rotatable joint 110, an axle 240 extends through the first interlocking portion 210 and the second interlocking portion 220 and defines an axis of rotation of the rotatable joint 110. In the illustrated embodiments, the axle 240 is a threaded shaft configured to mate with a threaded hole 228 formed in the hub 226 of the second interlocking portion 220. However, it will be appreciated by one of skill in the art that other axle configurations, such as an unthreaded shaft that is pinned in place, could be used in a rotatable joint 110 in other embodiments. When inserted through the first interlocking portion 210 and the second interlocking portion 220, in the illustrated embodiment, the axle 240 may be advanced to bias the interlocking portions 210, 220 of the rotatable joint 110 into the secured position. Likewise, the axle 240 may be backed out of the threaded hole 228 in the second interlocking portion 220 to configure the rotatable joint 110 in a rotatable position. The axle 240 may be backed out further to allow the beam 102 of a storage device to be removed from the first interlocking portion 210 of the rotatable joint 110 by lifting the beam 102 out of the open end of the opening in the first interlocking portion 210.

Advantageously, the rotatable joint 110 may be configured to allow rapid and easy installation and removal of the beam 102 from the vehicle bed without removing the bed mount from the vehicle and without removing the axle 240 from the second interlocking portion 220. In the illustrated embodiments, the hub 226 of the second interlocking portion 220 is shaped as a generally rectangular body having two parallel generally straight sides and two opposing sides with an arcuate profile. The hub is sized such that the parallel sides are longer than a width of the narrowest entry 238 into the opening 232 of the first interlocking surface 230. However, the parallel sides are spaced apart at a shorter distance than the width of the narrowest entry 238 into the opening 232. Thus, in the illustrated embodiment, when the beam 102 is oriented approximately half way between the bed divider and overhead rack configurations, with the axle 240 backed out, the beam 102 may be easily installed or removed from the first interlocking portion 210 and the vehicle bed. At other orientations of the beam relative to the vehicle bed, interference between the hub 226 and the opening 232 will restrain the beam 102 from being removed from the vehicle bed. It is contemplated that alternative configurations of first and second interlocking portions could allow other removal options. For example, the hub 226 could be oriented such that the beam 102 is removable at a different relative orientation of beam 102 and vehicle bed.

With the rotatable joint 110 in a rotatable position, the beam 102 of a storage device may be freely rotated with respect to the vehicle bed. During the rotation, as one of the plurality of ridges on the second interlocking portion 220 enters a recess 231 of the first interlocking portion 210, the rotatable joint 110 has reached a stop position. When the rotatable joint 110 reaches a stop position, a user rotating the beam 102 will feel the beam 102 snap into place, offering resistance to further movement. The user may also hear the beam 102 audibly pop or click into a stop position. Upon reaching a stop, the user may configure the rotatable joint 110 into the secured position by advancing the axle 240 into the second interlocking portion 220. Once in the secured position, further rotation of the beam 102 is restricted by the rotatable joint 110, and the user may secure cargo to the beam 102.

Clamp

Figure 5:
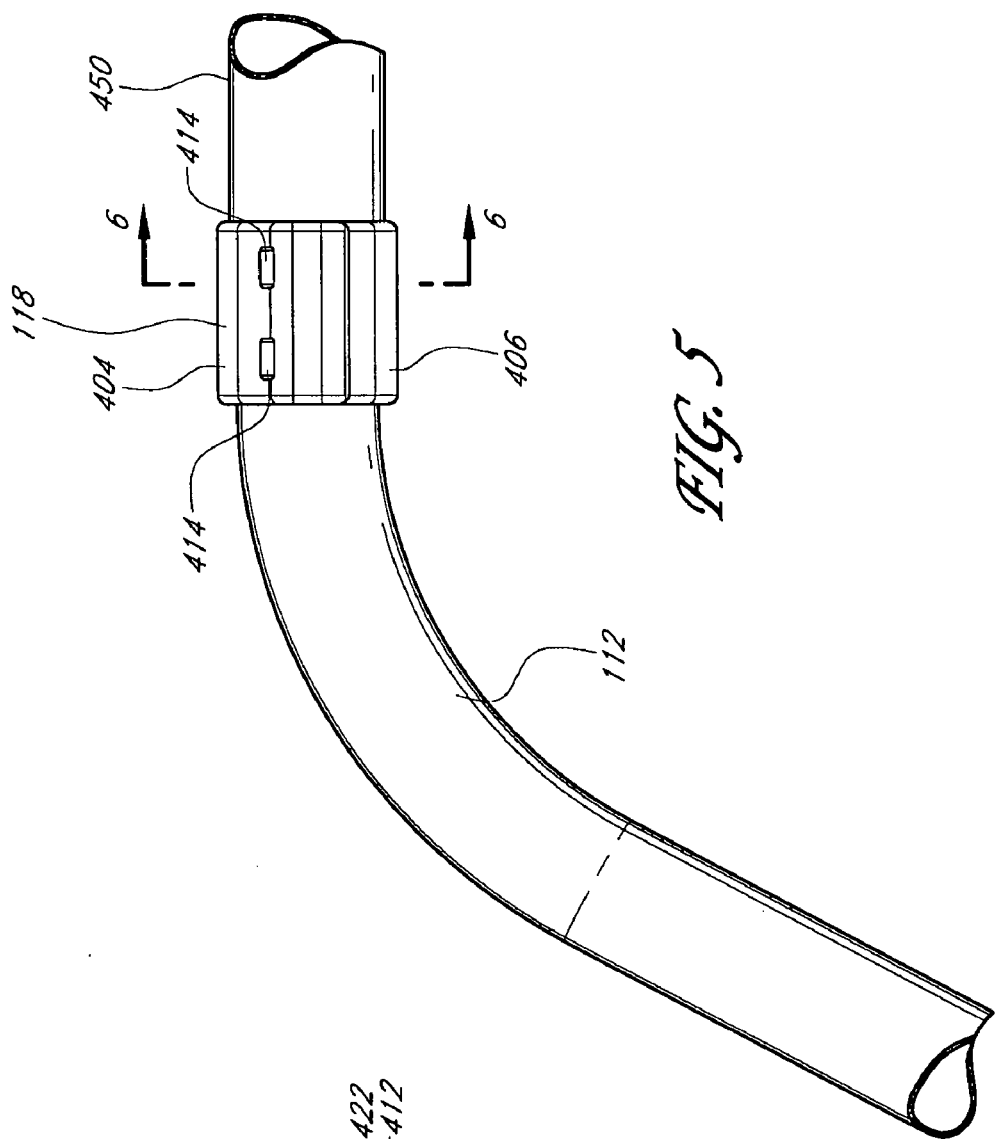
FIG. 5 illustrates a side view of the tubular clamp of FIG. 4.
Figure 6:
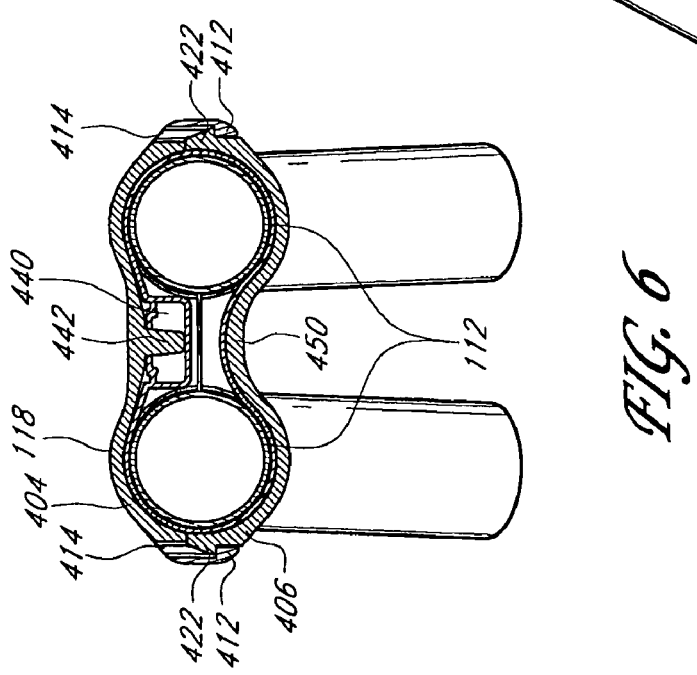
FIG. 6 illustrates a cut away view of the tubular clamp of FIG. 5 along line 6-6.

As noted above with respect to the storage device of FIG. 1, in certain embodiments, the storage device includes clamps 114, 116, 118, 120 to maintain the relative positions of the two tubular members 112 forming the beam 102. FIGS. 4-6 illustrate an embodiment of clamp for use in the vehicle bed storage device 100 of FIG. 1. While FIGS. 4-7 depict a mount clamp 118 of the storage device, the structure of the mount clamp 118 could be applied to create an endcap cap 114, 116, as illustrated in FIG. 1. With reference to FIG. 4, the clamp 118 comprises a housing 402 comprising a first housing portion 404, a second housing portion 406, and an adjustable tensioner.

As illustrated in FIGS. 4 and 5, the clamp comprises a housing 402 having a first housing portion 404 and a second housing portion 406. The housing portions 404, 406 are configured to be assembled into the housing 402 around the two tubular members 112 such that the tubular members 112 are retained in an aligned orientation. As further described below, the first and second housing portions 404, 406 are joined to form the housing 402 by interfering features or interlocking structures on the housing portions 404, 406 such as interlocking wedges or a mateable tab and slot. Additionally, a fastening device such as a screw may be advanced into threaded holes in each of the housing portions 404, 406 to firmly join the housing portions 404, 406 around the tubular members 112. Either a fastener or interference features (e.g., interlock structures) alone may be used to assemble the first and second housing portions 404, 406 into the housing. However, the combination of interlocking interference features (e.g., interlock structures) with an adjustable fastener provides a stiff, strong retention of the tubular members 112. Because of the inherent strength of the assembly of housing portions 404, 406, the housing 402 may be composed of a relatively low strength material such as a plastic. Such materials are typically relatively low cost to produce, and manufacture.

Figure 7:
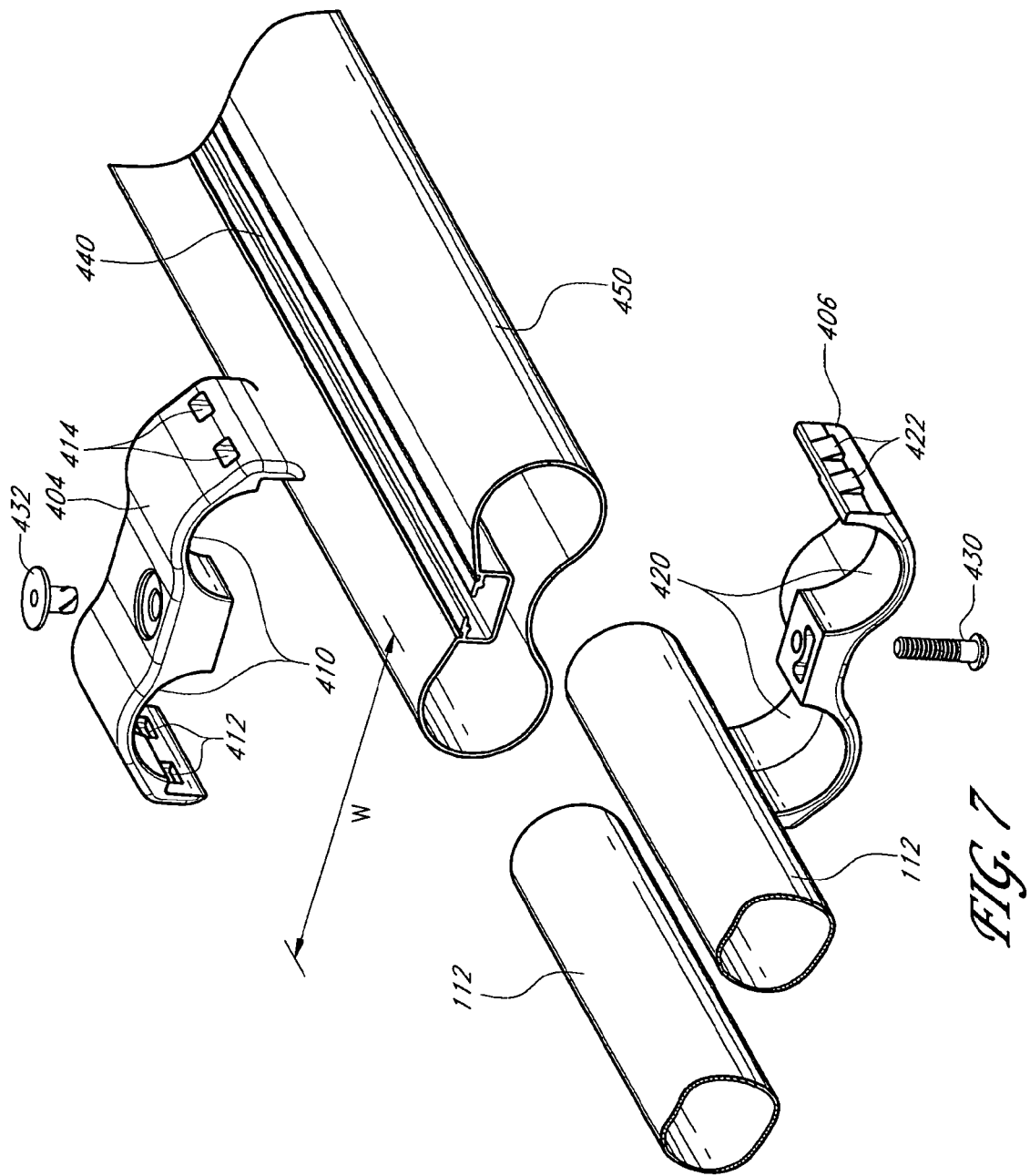
FIG. 7 illustrates an exploded perspective view of a sleeve-based mount for use with the storage device of FIG. 1.

As illustrated in FIGS. 4 through 7, the first housing portion 404 forms substantially half of the housing 402 and includes two substantially semi-circular recesses 410 (FIG. 7). Each of the semi-circular recesses 410 is configured to extend around approximately one half of a corresponding tubular member 112. It will be appreciated by one of skill in the art that the first housing portion 404 may have more recesses 410 where the clamp 118 is configured to retain more than two tubular members 112. It will be further appreciated by one of skill in the art that the recesses 410 may be formed in other than circular shapes to retain members with other than circular cross sections. For example, a recess 410 could be configured to retain a beam 102 with an oval, square, triangular, or other cross sectional profile. Additionally, it is contemplated that in certain embodiments, only one housing portion will include a recess to retain a tubular member. But, desirably, both housing portions include recesses as described and illustrated in further detail herein.

As illustrated in FIG. 7, the first housing portion 404 includes interlock structures 412 that can include two first interference or interlock surfaces formed on each edge of the first housing portion 404. The interlock surfaces are configured to interlock with mating second interlock surfaces of a second interlock structure 422 on the second housing portion 406. The first housing portion 404 desirably also includes two access holes 414 on each edge, corresponding to the two interlock surfaces and configured such that a user can insert a screwdriver or other implement to disengage the first interlock surfaces of the first interlock structure 412 on the first housing portion 404 from the mating interlock surfaces of the second interlock structure 422 on the on the lower housing portion 406.

The second housing portion 406 forms substantially half of the housing 402 and includes two substantially semi-circular recesses 420. Each of the semi-circular recesses 420 is configured to extend around approximately one half of a corresponding tubular member 112. As with the first housing portion 404, it will be appreciated by one of skill in the art that different numbers and shapes of recesses could be formed in the housing 402 to accommodate different numbers and geometries of tubular members 112. Desirably, however, a pair of mating semi-circular recesses about tubular members having circular cross-sections prevent movement of the tubular members in all directions for strength and to prevent vibration and/or rattling.

The second housing includes a second interlock structure 422 with an interlock surface at an upper end of outer edges of the second housing portion 406. When the first and second housing portions 404, 406 are assembled around two tubular members 112, the first interference or interlock surfaces of the first interlocking structure 412 of the first housing portion 404 interlock with the second interference surfaces of the second interlock structure 422 of the second housing portion 406 as illustrated in FIG. 6. This interlocking provides support for the two tubular members 112 about their periphery, thus strongly retaining the tubular members 112 in an aligned orientation. As depicted, the second interlock structures 422 each comprise a wedge. The wedge comprises a first side defining a lead-in surface. The lead-in surface is configured to bias an outer wall of the first housing portion 404 outward to facilitate mating of the first housing portion 404 with the second housing portion 406. As the first and second housing portions 404, 406 are advanced into a mated configuration, the first side defines a glide surface along which the first and second housing portions are in slideable contact. A second side of the wedge defines a catch or interlock surface configured to engage the first interlock surface of the first interlock structure 412 and maintain a mated engagement between the first housing portion 404 and the second housing portion 406.

While the illustrated embodiments include interlocking interference features such as interlock surfaces defined by interlock structures 412, 422, including a wedge and a catch, it will be appreciated by one of skill in the art that other interlocking structures could be included to connect the first and second housing portions 404, 406. For example, at least one tab on one of the housing portions 404, 406 could be configured to mate with a corresponding recess on the other of the housing portions 404, 406.

As best illustrated in FIG. 7, the housing 402 further comprises a fastener and, preferably, an adjustable tensioner 430. In the illustrated embodiments, the adjustable tensioner 430 comprises a threaded bolt configured to advance through a corresponding threaded hole on the first housing portion 404 and a threaded hole on the second housing portion 406. The threaded holes are preferably located on housing portions 404, 406 at a protrusion in the housing portions located between the recesses 410, 420. The threaded bolt may be advanced through the threaded holes, and, as advanced, apply pressure to the first housing portion 404 against the second housing portion 406. In combination with the interlock structures 412, 422, which retain the tubular members 112 at an outer edge of the housing 402, the adjustable tensioner 430 biases the housing portions 404, 406 towards one another. This combination of restraints results in an application of a retention force substantially encircling the tubular members 112. Thus, given the inherent retention strength of the interlocking structures 412, 422 and adjustable tensioner 430 configuration, the housing 402 can be constructed of fairly low strength materials such as plastics and still be capable of retaining tubular members 112 in an aligned configuration in a vehicle storage device. In embodiments where the housing portions 404, 406 are comprised of plastics, the threaded holes may comprise threaded metal inserts 432 fit to recesses formed in the housing portions 404, 406.

Sleeve-Based Mounting Interface

With a vehicle storage device 100 as illustrated in FIG. 1, it can be desirable to provide a mounting interface that is capable of receiving different mounting brackets. Advantageously, such a mounting interface enhances the cargo transporting ability of the storage device 100 as it is not limited to an application-specific role. With reference to FIGS. 1, 4, and 6-7, a mounting interface is provided that includes a channel 440 configured to receive any of a number of application-specific mounting brackets. Mounts configured to be retained in the channel 440 could be available for lumber, skis, bicycles, surfboards, ladders, and other commonly hauled items. The mounts may be placed at any location along the channel, thus allowing a wide variety of shapes and sizes of objects to be carried on the storage device 100. The channel 440 is formed in an upper surface of a sleeve 450 configured to encircle the tubular members 112. The channel 440 extends across at least a portion of the sleeve 450 and preferably extends substantially along the entire length of the sleeve 450 and, more preferably, the entire length of the sleeve.

The sleeve 450 comprises an elongate body having two aligned passages extending longitudinally therethrough. The passages are shaped and configured to receive a portion of a tubular member 112. As depicted, the sleeve 450 has a first end and a second end and, between the first and second ends, spans the substantially horizontal segment 104 of the beam 102. As illustrated in FIGS. 1 and 4-6, the ends of the sleeve 450 are secured to the tubular members 112 with mount clamps 118, 120. The mount clamps 118, 120 restrict sliding movement of the sleeve 450 relative to the tubular members 112.

When used to secure ends of the sleeve 450 to the beam 102, as illustrated in FIGS. 5 through 7, the housing portions 404, 406 of the mount clamps 118, 120 may include recesses 410, 420 having stepped profiles such that for a first section, the profiles of the recesses 410, 420 formed in the housing portion are configured to encircle the tubular members 112 and for a second section, the profiles of the recesses 410, 420 formed in the housing portions 404, 406 are configured to encircle the sleeve 450. Further, as noted above, in embodiments of mount clamp 118, 120 adapted to secure the sleeve 450 to the beam 102, the first housing portion 404 may comprise a tongue 442 (FIG. 6) configured to rest in the channel 440 and maintain the position of the sleeve 450 relative to the tubular members 112.

Clamp-Based Mounting Interface

Figure 8:
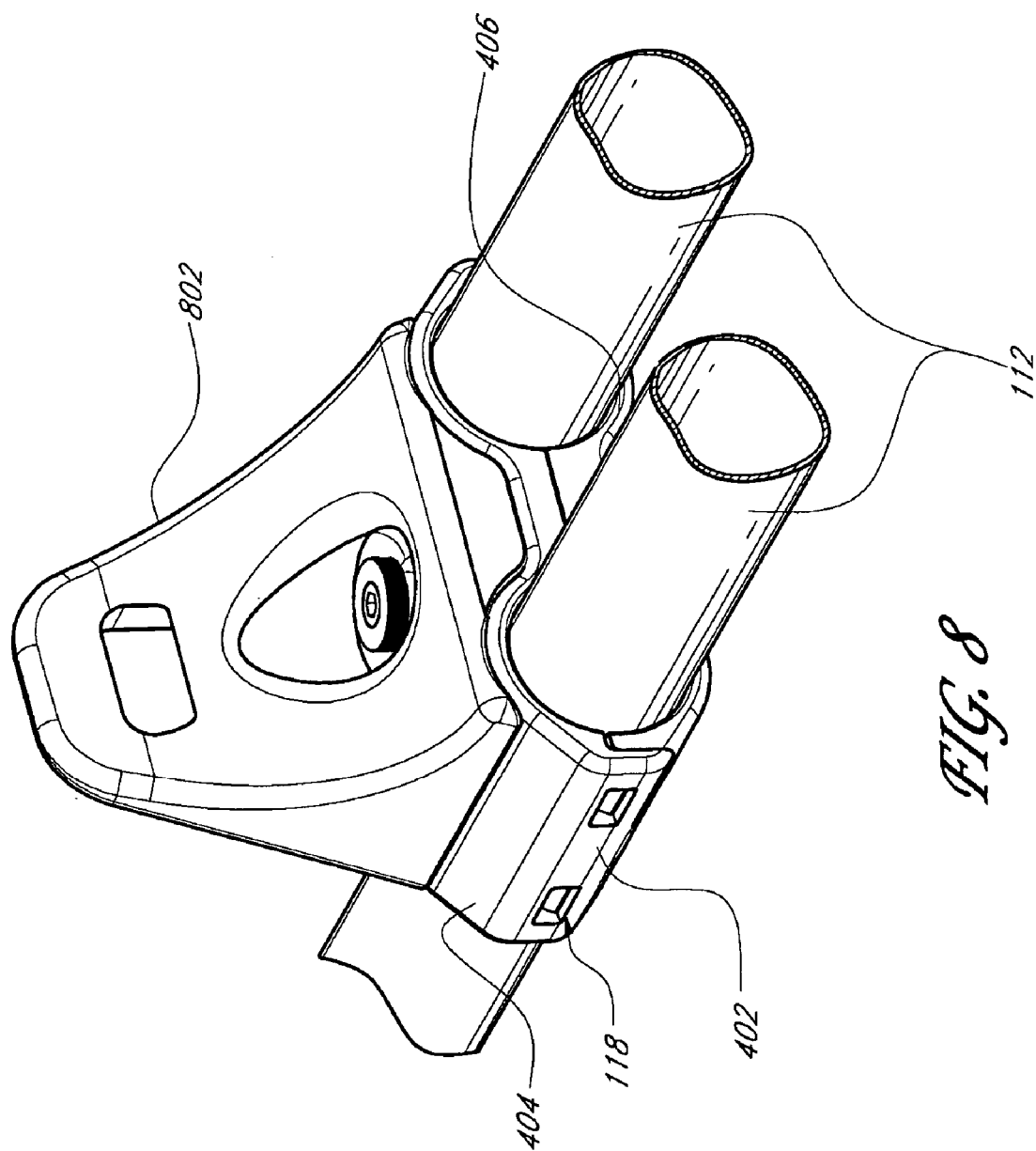
FIG. 8 illustrates a perspective view of a clamp-based mount for use with the storage device of FIG. 1.
Figure 9:
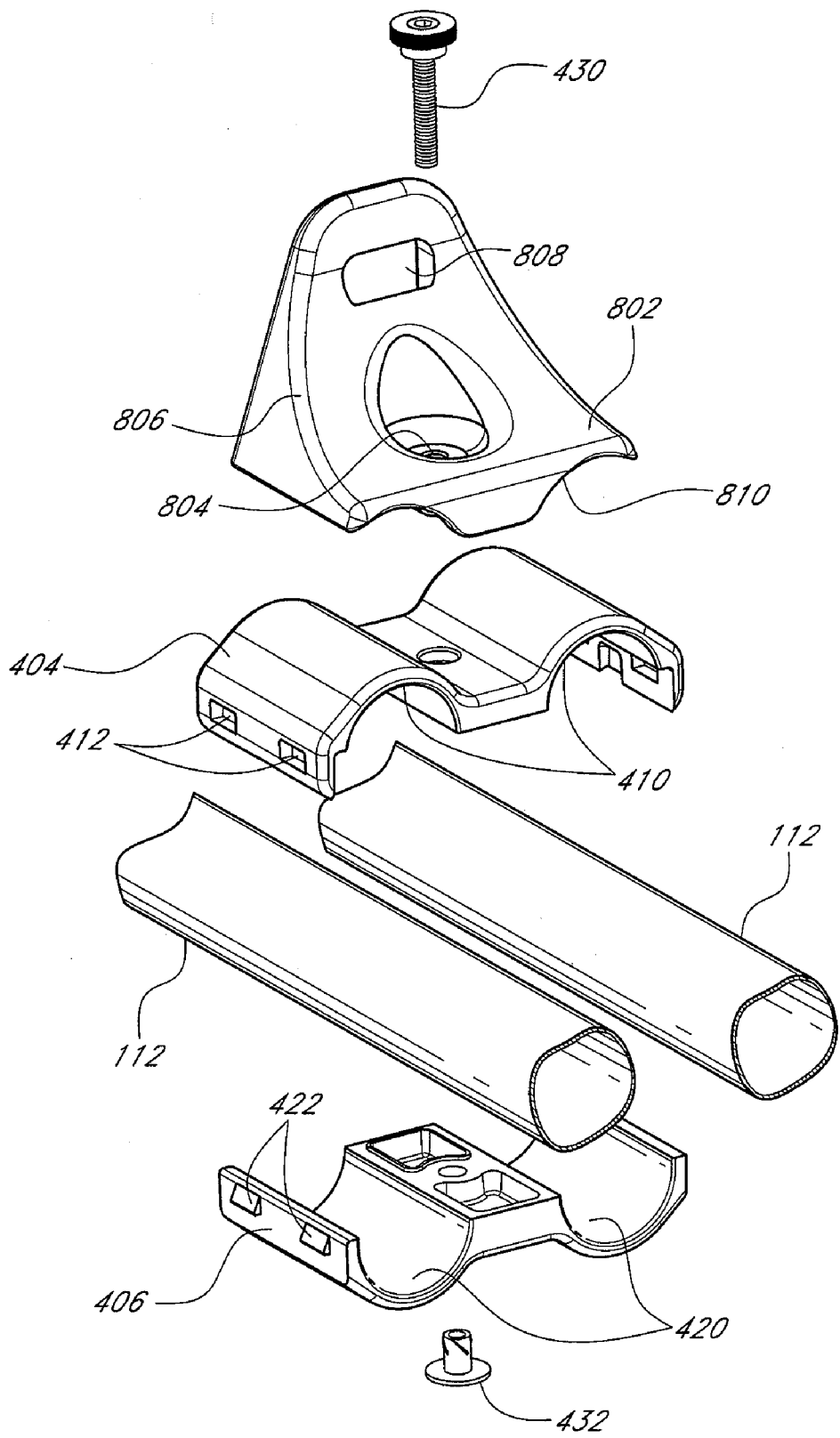
FIG. 9 illustrates an exploded view of a clamp-based mount for use with the storage device of FIG. 1.

Another embodiment of mounting interface for use with a storage device 100 is depicted in FIGS. 8-9. In this embodiment, the mounting interface comprises a mount clamp 118 as discussed above with reference to FIGS. 4-6 and a mounting bracket 802 disposed on the clamp 118. In various embodiments, the mounting bracket 802 can be formed on a surface of the first housing portion 404, removably affixed to the clamp 118 with fasteners, adhered to the clamp 118, or removably or permanently attached to the clamp 118 by another technique. Preferably, the mounting bracket 802 is removably attached to the clamp 118 at a hole 804 therethrough for receiving the adjustable tensioner 430 of the clamp. A lower surface 810 of the mounting bracket 802 is desirably contoured to be a substantially matched opposite of an upper surface of the first housing portion 404 such that the mounting bracket 802 is configured to rest flushly upon the clamp 118. (FIG. 9). Advancing the adjustable tensioning member 430 through the mounting bracket 802 and the housing portions 404, 406 secures the mounting bracket to the clamp 118 and secures the clamp 118 about the two tubular members 112. Desirably, an upper surface of the first housing portion 404 and the lower surface 810 of the mounting bracket 802 form a first pair of interfering surfaces which prevent forward and rearward movement of the bracket and housing relative to one another. Desirably, as in the preferred embodiment, the bracket and housing form more than one pair of interfering surfaces so that forces are distributed along both clamps and risk of failure is likewise distributed.

Advantageously, the clamp-based mounting interface is highly versatile. By loosening the adjustable tensioner 430, the mounting interface could be quickly and easily relocated to substantially any location on the beam 102 or removed from the beam 102 completely. Further, the mounting interface could be used with application-specific mounting brackets. As illustrated, the mounting bracket 802 is essentially a tie-down cleat comprising a body 806 extending upward from the housing 402 and a hole 808 through the body 806 configured to retain cargo such as a mounted device or a strap, cord, or cable retaining a mounted device. In the illustrated embodiments, the body 806 defines a face transverse to an axis of the housing 402, and the hole 808 extends through the face. But, other mounting brackets configured to carry various cargo items such as building supplies, recreational equipment, or luggage could be used in a clamp-based mount.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A mount apparatus comprising:
   a housing comprising:
   a first housing portion 404 comprising:
   more than one recess 410, 410, each recess 410 configured to receive a portion of one of more than one aligned tubular members 112, and
   a first interlock structure 412 defining at least one first interlock surface;
   a second housing portion 406 comprising:
   more than one recess 420, 420, each recess 420 configured to receive a portion of one of more than one aligned tubular members 112, and
   a second interlock structure 422 defining at least one second interlock surface, the at least one second interlock surface configured to mate with the at least one first interlock surface on the first housing portion 404 such that contact between the at least one first interlock surface and the at least one second interlock surface couples the first housing portion 404 and the second housing portion 406 in a mating engagement: and
   a mounting bracket 802 extending from the housing 404, 406 and configured to retain cargo, wherein the mounting bracket is removably connected to the housing.

2. The mount apparatus of claim 1, further comprising a fastener.

3. The mount apparatus of claim 2, wherein the fastener comprises an adjustable tensioner configured to securably advance the first housing portion towards the second housing portion.

4. The mount apparatus of claim 3, wherein the adjustable tensioner removably connects the mounting bracket to the housing.

5. The mount apparatus of claim 1, wherein the mounting bracket comprises:
   a body 806 extending upward from the housing; and
   a hole 808 through the body 806 configured to retain the cargo.

6. The mount apparatus of claim 5, wherein the body 806 defines a face transverse to an axis of the housing.

* * * * *

UNITED STATES PATENT AND TRADEMARK OFFICE
CERTIFICATE OF CORRECTION

PATENT NO. : 7,464,976 B2  Page 1 of 1
APPLICATION NO. : 11/588822
DATED : December 16, 2008
INVENTOR(S) : Anthony Smith It is certified that error appears in the above-identified patent and that said Letters Patent is hereby corrected as shown below:

Title page 1 item [73] Assignee, line 1, change "89908, Inc.," to --89908, Inc. dba AMP RESEARCH--.

At column 10, line 29, before "lower" delete "on the".

At column 10, line 50, change "interference" to --interference or interlock--.

At column 14, line 4, in Claim 1, change "engagement:" to --engagement;--.

Signed and Sealed this

Ninth Day of March, 2010

David J. Kappos
*Director of the United States Patent and Trademark Office*